(12) United States Patent
Irisawa et al.

(10) Patent No.: US 8,066,906 B2
(45) Date of Patent: Nov. 29, 2011

(54) POLYMERIZABLE COMPOUND AND POLYMERIZABLE COMPOSITION

(75) Inventors: Masatomi Irisawa, Saitama (JP); Mineki Hasegawa, Saitama (JP)

(73) Assignee: Adeka Corporation, Tokyo (JP)

( * ) Notice: Subject to any disclaimer, the term of this patent is extended or adjusted under 35 U.S.C. 154(b) by 194 days.

(21) Appl. No.: 12/446,137

(22) PCT Filed: Oct. 9, 2007

(86) PCT No.: PCT/JP2007/069700
§ 371 (c)(1),
(2), (4) Date: Apr. 17, 2009

(87) PCT Pub. No.: WO2008/078445
PCT Pub. Date: Jul. 3, 2008

(65) Prior Publication Data
US 2010/0320419 A1  Dec. 23, 2010

(30) Foreign Application Priority Data
Dec. 26, 2006 (JP) .................. 2006-350470

(51) Int. Cl.
C09K 19/00 (2006.01)
C09K 19/06 (2006.01)
C09K 19/32 (2006.01)
C09K 19/52 (2006.01)

(52) U.S. Cl. ......... 252/299.6; 252/299.01; 252/299.61; 252/299.62; 252/299.63; 252/299.64; 252/299.65; 252/299.66; 252/299.67; 430/20; 428/1.1; 560/10

(58) Field of Classification Search ............. 252/299.01, 252/299.6–299.67; 560/10; 428/1.1; 430/20
See application file for complete search history.

(56) References Cited

U.S. PATENT DOCUMENTS
7,811,467 B2 * 10/2010 Yamahara et al. ....... 252/299.01
2004/0222403 A1 11/2004 Sasada et al.

FOREIGN PATENT DOCUMENTS
| JP | 08-231958 | 9/1996 |
| JP | 11-021269 | 1/1999 |
| JP | 11-148080 | 6/1999 |
| JP | 2003-313250 | 11/2003 |
| JP | 2004-231638 | 8/2004 |
| JP | 2005-196221 | 7/2005 |
| JP | 2006-084985 | 3/2006 |
| JP | 2006-193596 | 7/2006 |
| JP | 2006-306936 | 11/2006 |
| WO | WO2005/092826 | 10/2005 |
| WO | WO2006/030630 | 3/2006 |
| WO | WO2006/030631 | 3/2006 |
| WO | WO2006/137257 | 12/2006 |

* cited by examiner

Primary Examiner — Geraldina Visconti
(74) Attorney, Agent, or Firm — Young & Thompson

(57) ABSTRACT

A polymerizable compound represented by general formula (1):

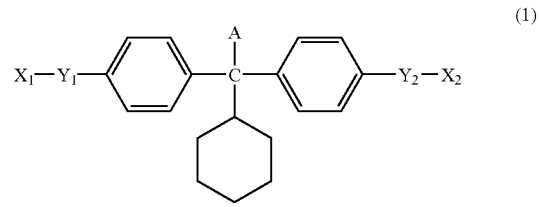

(1)

wherein A represents a ring assembly composed of at least two 6-membered rings each optionally having a substituent; $X_1$ and $X_2$ each represent a (meth)acryloyloxy group; and $Y_1$ and $Y_2$ each independently represent a single bond, an optionally branched alkylene group having 1 to 8 carbon atoms, an ether linkage, —COO—, —OCO—, a 6-membered ring optionally having a substituent, a naphthalene ring optionally having a substituent, or a combination thereof; the substituent being a hydrogen atom, a halogen atom, a nitrile group, an optionally branched alkyl group having 1 to 8 carbon atoms, an optionally branched alkoxy group having 1 to 8 carbon atoms, or an optionally branched alkenyl group having 2 to 8 carbon atoms, wherein the alkyl, alkoxy, or alkenyl group may have its —CH$_2$— moiety replaced with a sulfur atom or an oxygen atom and may have its hydrogen atom replaced with a halogen atom or a nitrite group.

20 Claims, No Drawings

POLYMERIZABLE COMPOUND AND POLYMERIZABLE COMPOSITION

TECHNICAL FIELD

This invention relates to a novel polymerizable compound having a (meth)acryloyloxy group and a polymerizable composition containing the polymerizable compound. The polymerizable composition photocures with good control in thin film formation, good retention of liquid crystal alignment, and curability to provide a polymer useful as an optical element, such as an optical film for a display device and a polarizing prism.

BACKGROUND ART

Liquid crystals are applied to display media in which the reversible movement of liquid crystal molecules is made use of, such as display devices of various modes typified by twisted nematic (TN), vertical alignment (VA), and in-place-switching (IPS). Besides the application to display media, the liquid crystals, particularly those having a polymerizable functional group have been studied for applicability to optically anisotropic materials, such as a retardation film, a polarizer, a polarizing prism, a luminance-improving film, a low pass filter, various optical filters, and optical fibers, taking advantage of their anisotropy in physical properties, such as refractive index, dielectric constant, magnetic susceptibility, elastic modulus, and thermal expansion coefficient, as well as their alignment properties. It is important for the optically anisotropic material (polymer) obtained by the polymerization to have not only the optical anisotropy but other characteristics, such as polymerization rate, transparency, mechanical strength, coating properties, solubility, crystallinity, shrinking properties, water permeability, water absorption, melting point, glass transition point, clear point, chemical resistance, and heat resistance.

The optically anisotropic material (polymer) is obtained by, for example, uniformly aligning the molecules of a liquid crystal compound having a polymerizable functional group or a polymerizable composition containing the liquid crystal compound into a liquid crystal phase and irradiating the compound or the composition being in the liquid crystal phase with energy rays, such as ultraviolet rays, to cause photopolymerization. It is required to fix the aligned state of the liquid crystal compound uniformly and semi-permanently.

When the polymerizable composition has a high liquid crystal phase transition temperature, photopolymerization induced by energy rays may unintentionally invite thermal polymerization, which disturbs the uniform alignment of the liquid crystal molecules, making it difficult to fix a desired state of alignment. In order to facilitate temperature control during cure, a polymerizable composition showing a liquid crystal phase at or near room temperature is demanded.

The polymer is obtained by polymerizing the polymerizable composition in the form of coating film applied to a substrate. If the composition contains a non-polymerizable compound, the resulting polymer film may have insufficient strength or contain residual stress-induced strain. Removing a non-polymerizable compound using, e.g., a solvent can result in a failure to retain film homogeneity and cause unevenness. To obtain a polymer film with a uniform thickness, it is therefore preferred to apply a polymerizable composition in the form of a solution in a solvent to a substrate. Hence, it is desirable for a liquid crystal compound or a polymerizable composition containing it to have good solubility in a solvent.

To cope with the tendencies to reduction in thickness and weight of display devices, components making up the display devices including optical films have been requested to have a reduced thickness.

A polymerizable liquid crystal compound having an acryloyloxy group as a polymerizable functional group exhibits high polymerization reactivity, i.e., readily polymerizes through a convenient method (e.g., UV irradiation), and the resulting polymer has high transparency and has therefore been extensively studied for use as an optically anisotropic material (see, e.g., Patent Document 1, Patent Document 2, Patent Document 3, and Patent Document 4). However, any of the polymerizable compositions disclosed in these reference documents has the disadvantage of difficulty in controlling film formation with a reduced thickness.

In general, formation of a thick film from a polymerizable composition containing a liquid crystal compound encounters with difficulty in controlling molecular alignment of the liquid crystal compound, which can cause problems, such as reduction in transmittance and coloration. On the other hand, a thin polymer film having satisfactory molecular alignment over the entire area can be obtained, but formation of a thin film has difficulty in thickness control, readily resulting in non-uniform surface condition or crystallization. Furthermore, the liquid crystal state resulting from alignment control shows poor stability and tends to be disturbed before curing by irradiation with, e.g., UV light. Conventional known polymerizable compositions have thus failed to provide a satisfactory polymer.

Although Patent Document 5 supra discloses an epoxy compound that cures on irradiation with light, it is not pertinent to utilization as a liquid crystal material, nor does it teach or even suggest the effect on control in film formation and fixation of liquid crystal alignment.

Patent Document 1: JP 2006-193596A
Patent Document 2: JP 2005-196221A
Patent Document 3: JP 11-148080A
Patent Document 4: JP 8-231958A
Patent Document 5: JP 2006-84985A

DISCLOSURE OF THE INVENTION

Problem to be Solved by the Invention

An object of the invention is to provide a polymerizable composition photocuring to provide a polymer which, even in the form of a thin film, exhibits a uniform film condition, high heat resistance, well controlled alignment, and excellent optical characteristics.

Means for Solving the Problem

The present inventors have conducted extensive investigations and found, as a result, that the above object of the invention is accomplished by the provision of a polymerizable composition containing a polymerizable compound having a specific chemical structure. The present invention has thus been completed.

The invention provides a polymerizable compound represented by general formula (1) below to achieve the object of the invention.

[Formula 1]

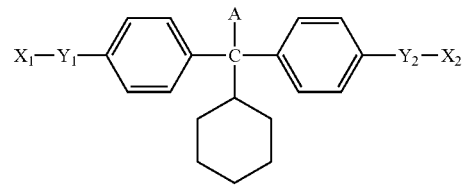

(1)

wherein A represents a ring assembly composed of at least two 6-membered rings each optionally having a substituent;

$X_1$ and $X_2$ each represent a (meth)acryloyloxy group; and $Y_1$ and $Y_2$ each independently represent a single bond, an optionally branched alkylene group having 1 to 8 carbon atoms, an ether linkage, —COO—, —OCO—, a 6-membered ring optionally having a substituent, a naphthalene ring optionally having a substituent, or a combination thereof; the substituent being a hydrogen atom, a halogen atom, a nitrile group, an optionally branched alkyl group having 1 to 8 carbon atoms, an optionally branched alkoxy group having 1 to 8 carbon atoms, or an optionally branched alkenyl group having 2 to 8 carbon atoms, wherein the alkyl, alkoxy, or alkenyl group may have its —$CH_2$— moiety replaced with a sulfur atom or an oxygen atom and may have its hydrogen atom replaced with a halogen atom or a nitrile group.

The invention also provides an embodiment of the polymerizable compound of general formula (1), in which each of the structures represented by $X_1$—$Y_1$— and $X_2$—$Y_2$— is a member selected from formulae (2) to (5):

[Formula 2]

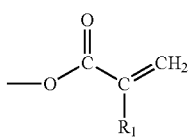
(2)

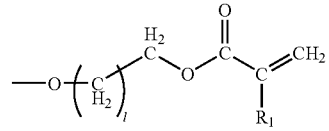
(3)

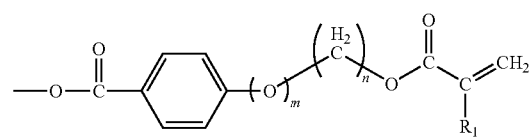
(4)

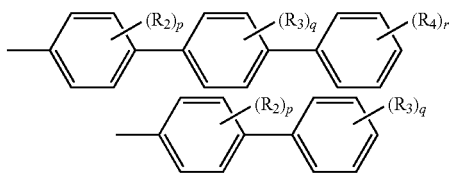
(5)

wherein $R_1$ represents a hydrogen atom or a methyl group; l represents an integer 0 to 7; m represents 0 or 1; and n represents an integer 0 to 8.

The invention also provides an embodiment of the polymerizable compound of general formula (1), in which A is a member selected from the group consisting of the following ring assemblies:

[Formula 3]

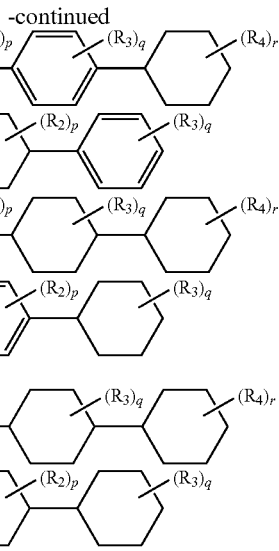

-continued wherein $R_2$, $R_3$, and $R_4$ each represent a hydrogen atom, a halogen atom, a nitrite group, an optionally branched alkyl group having 1 to 8 carbon atoms, an optionally branched alkoxy group having 1 to 8 carbon atoms, or an optionally branched alkenyl group having 2 to 8 carbon atoms, in which the alkyl, alkoxy or alkenyl group may have its —$CH_2$— moiety replaced with a sulfur atom or an oxygen atom and may have its hydrogen atom replaced with a halogen atom or a nitrile group; p, q, and r each represent the maximum number of the substituents the benzene ring or the cyclohexyl ring may have; the $R_2$'s may be the same or different, the $R_3$'s may be the same or different, and the $R_4$'s may be the same or different.

The invention also provides an embodiment of the polymerizable compound of general formula (1), in which A is represented by formula (6):

[Formula 4]

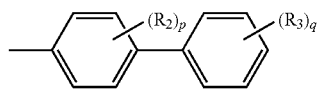
(6)

wherein $R_2$ and $R_3$ each independently represent a hydrogen atom, a halogen atom, a nitrile group, an optionally branched alkyl group having 1 to 8 carbon atoms, an optionally branched alkoxy group having 1 to 8 carbon atoms, or an optionally branched alkenyl group having 2 to 8 carbon atoms, wherein the alkyl, alkoxy, or alkenyl group may have its —$CH_2$— moiety replaced with a sulfur atom or an oxygen atom and may have its hydrogen atom replaced with a halogen atom or a nitrile group; p represents 4; q represents 5; the $R_2$'s may be the same or different; and the $R_3$'s may be the same or different.

The invention also provides a polymerizable composition containing the polymerizable compound of the invention.

The invention also provides an embodiment of the polymerizable composition, wherein the composition further contains a liquid crystal compound.

The invention also provides an embodiment of the polymerizable composition, wherein the liquid crystal compound has a polymerizable functional group.

The invention also provides an embodiment of the polymerizable composition, wherein the composition further contains an optically active compound and has a cholesteric liquid crystal phase.

The invention also provides an embodiment of the polymerizable composition, wherein the composition further contains a radical polymerization initiator.

The invention also provides a polymer obtained by photopolymerizing the polymerizable composition of the invention.

The invention also provides an embodiment of the polymer, wherein the polymer has optical anisotropy.

The invention also provides an optical film for display devices that is formed of the polymer of the invention.

BEST MODE FOR CARRYING OUT THE INVENTION

The polymerizable compound according to the invention, the polymerizable composition of the invention that contains the polymerizable compound, and the polymer of the invention that is obtained by photopolymerizing the polymerizable composition will be described in detail with reference to their preferred embodiments.

The polymerizable compound according to the invention will be described first.

In general formula (1), the polymerizable functional groups having a (meth)acryloyloxy group at their terminal as represented by $X_1$—$Y_1$— and $X_2$—$Y_2$— may contain an optionally branched alkylene group having 1 to 8 carbon atoms, an ether linkage, —COO—, —OCO—, a substituted or unsubstituted 6-membered ring, or a substituted or unsubstituted naphthalene ring.

Examples of the optionally branched alkylene group having 1 to 8 carbon atoms as represented by $Y_1$ and $Y_2$ in general formula (1) include methylene, ethylene, propylene, methylethylene, butylene, 1-methylpropylene, 2-methylpropylene, 1,2-dimethylpropylene, 1,3-dimethylpropylene, 1-methylbutylene, 2-methylbutylene, 3-methylbutylene, 4-methylbutylene, 2,4-dimethylbutylene, 1,3-dimethylbutylene, pentylene, hexylene, heptylene, and octylene. Of the substituents that may be on the 6-membered or naphthalene ring represented by $Y_1$ and $Y_2$, the optionally branched alkyl group having 1 to 8 carbon atoms, the optionally branched alkoxy group having 1 to 8 carbon atoms, and the optionally branched alkenyl group having 2 to 8 carbon atoms are exemplified by those recited below with respect to A in general formula (1).

The polymerizable functional group is preferably represented by any one of formulae (2) to (5):

[Formula 5]

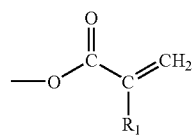
(2)

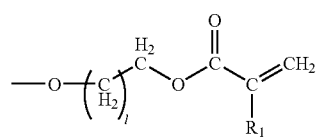
(3)

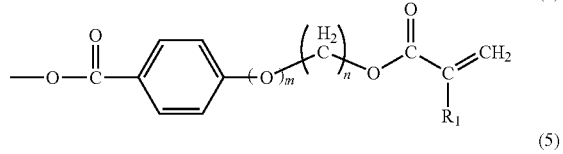
(4)

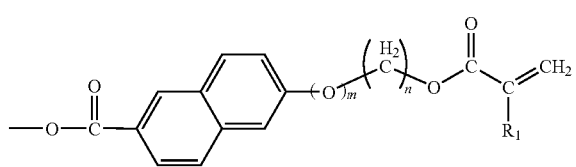
(5)

wherein $R_1$ represents a hydrogen atom or a methyl group; l represents an integer 0 to 7; m represents 0 or 1; and n represents an integer 0 to 8.

The ring assembly represented by A in general formula (1), which is composed of at least two optionally substituted 6-membered rings, may be any combination of a benzene ring and a cyclohexane ring, including biphenyl, terphenyl, quaterphenyl, 4-phenylcyclohexyl, 4-cyclohexylphenyl, and dicyclohexyl. The ring assembly may contain an alkylene group, a double bond, a triple bond, a carbonyl group, or an ether linkage as a linking group between the 6-membered rings.

The 6-membered ring may have its carbon atom replaced with a nitrogen atom or a sulfur atom. Examples of a nitrogen-containing 6-membered ring include pyridine, pyrazine, pyrimidine, pyridazine, triazine, piperidine, and piperazine. Examples of a sulfur-containing 6-membered ring are thiopyran and thiopyrylium.

The ring assembly may be substituted with a hydrogen atom, a halogen atom, a nitrile group, an optionally branched alkyl group having 1 to 8 carbon atoms, an optionally branched alkoxy group having 1 to 8 carbon atoms, an optionally branched alkenyl group having 2 to 8 carbon atoms, or a combination thereof.

Examples of the optionally branched alkyl group having 1 to 8 carbon atoms include straight-chain or branched alkyl groups, such as methyl, chloromethyl, trifluoromethyl, cyanomethyl, ethyl, dichloroethyl, propyl, isopropyl, butyl, sec-butyl, tert-butyl, isobutyl, amyl, isoamyl, tert-amyl, hexyl, 2-hexyl, 3-hexyl, cyclohexyl, 1-methylcyclohexyl, heptyl, 2-heptyl, 3-heptyl, isoheptyl, tert-heptyl, n-octyl, isooctyl, tert-octyl, and 2-ethylhexyl.

Examples of the optionally branched alkoxy group having 1 to 8 carbon atoms include straight-chain or branched alkoxy groups, such as methyloxy, ethyloxy, chloromethyloxy, trifluoromethyloxy, cyanomethyloxy, ethyloxy, dichloroethyloxy, propyloxy, isopropyloxy, butyloxy, sec-butyloxy, tert-butyloxy, isobutyloxy, amyloxy, isoamyloxy, tert-amyloxy, hexyloxy, cyclohexyloxy, heptyloxy, isoheptyloxy, tert-heptyloxy, n-octyloxy, isooctyloxy, tert-octyloxy, and 2-ethylhexyloxy.

Examples of the optionally branched alkenyl group having 2 to 8 carbon atoms include straight-chain or branched alkenyl groups, such as vinyl, propenyl, isopropenyl, butenyl, isobutenyl, and octenyl.

The —$CH_2$— moiety of the alkyl, alkoxy or alkenyl group may be replaced with a sulfur atom or an oxygen atom, and the hydrogen atom of the alkyl, alkoxy or alkenyl group may be replaced with a halogen atom or a nitrile group.

The ring assembly represented by A in general formula (1) is preferably selected from the structures shown below.

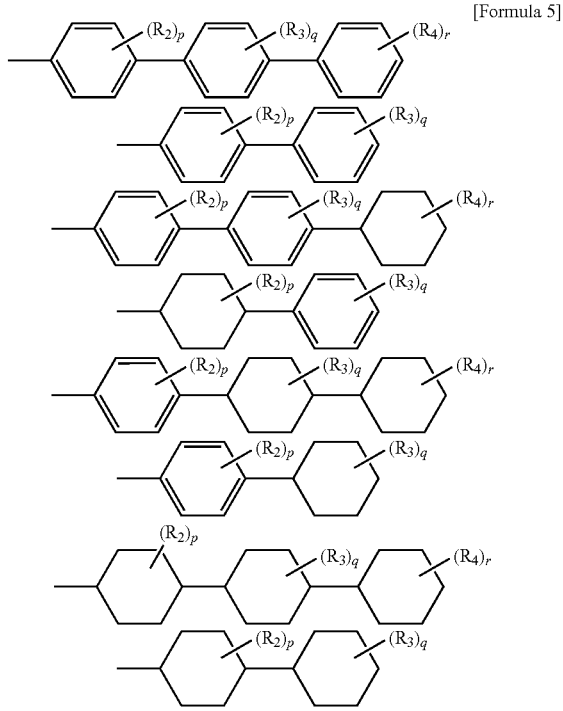

wherein $R_2$, $R_3$, and $R_4$ each represent a hydrogen atom, a halogen atom, a nitrile group, an optionally branched alkyl group having 1 to 8 carbon atoms, an optionally branched alkoxy group having 1 to 8 carbon atoms, or an optionally branched alkenyl group having 2 to 8 carbon atoms, in which the alkyl, alkoxy or alkenyl group may have its —$CH_2$— moiety replaced with a sulfur atom or an oxygen atom and may have its hydrogen atom replaced with a halogen atom or a nitrile group; p, q, and r each represent the maximum number of the substituents the benzene ring or the cyclohexyl ring may have; the $R_2$'s may be the same or different, the $R_3$'s may be the same or different, and the $R_4$'s may be the same or different.

The optionally branched alkyl group having 1 to 8 carbon atoms, the optionally branched alkoxy group having 1 to 8 carbon atoms, and the optionally branched alkenyl group having 2 to 8 carbon atoms represented by $R_2$, $R_3$, and $R_4$, are exemplified by those recited above with respect to A in general formula (1).

Particularly preferred of the ring assemblies shown above is the structure of formula (6):

[Formula 7]

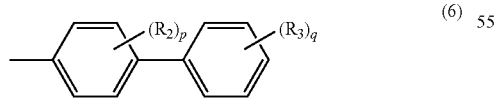

wherein $R_2$ and $R_3$ each independently represent a hydrogen atom, a halogen atom, a nitrile group, an optionally branched alkyl group having 1 to 8 carbon atoms, an optionally branched alkoxy group having 1 to 8 carbon atoms, or an optionally branched alkenyl group having 2 to 8 carbon atoms, wherein the alkyl, alkoxy, or alkenyl group may have its —$CH_2$— moiety replaced with a sulfur atom or an oxygen atom and may have its hydrogen atom replaced with a halogen atom or a nitrile group; p represents 4; q represents 5; the $R_2$'s may be the same or different; and the $R_3$'s may be the same or different.

Examples of the polymerizable compound represented by general formula (1) include, but are not limited to, the following compounds.

[Formula 8]

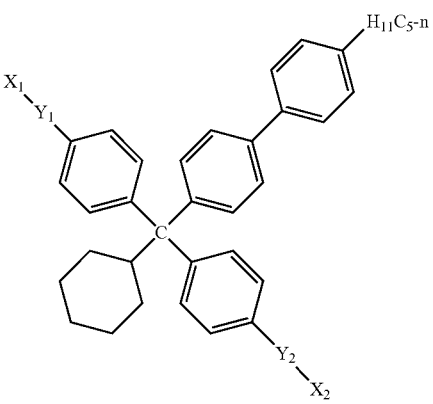

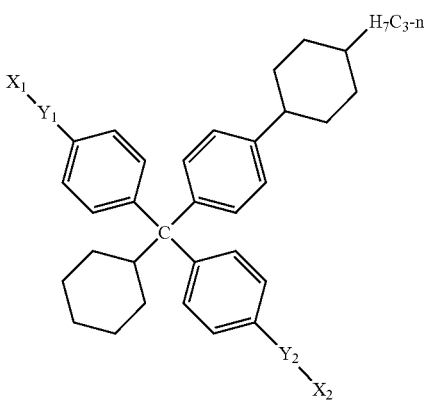

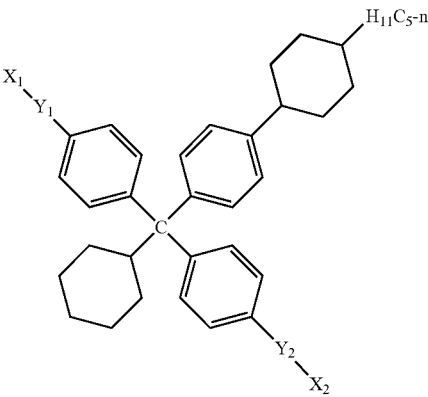

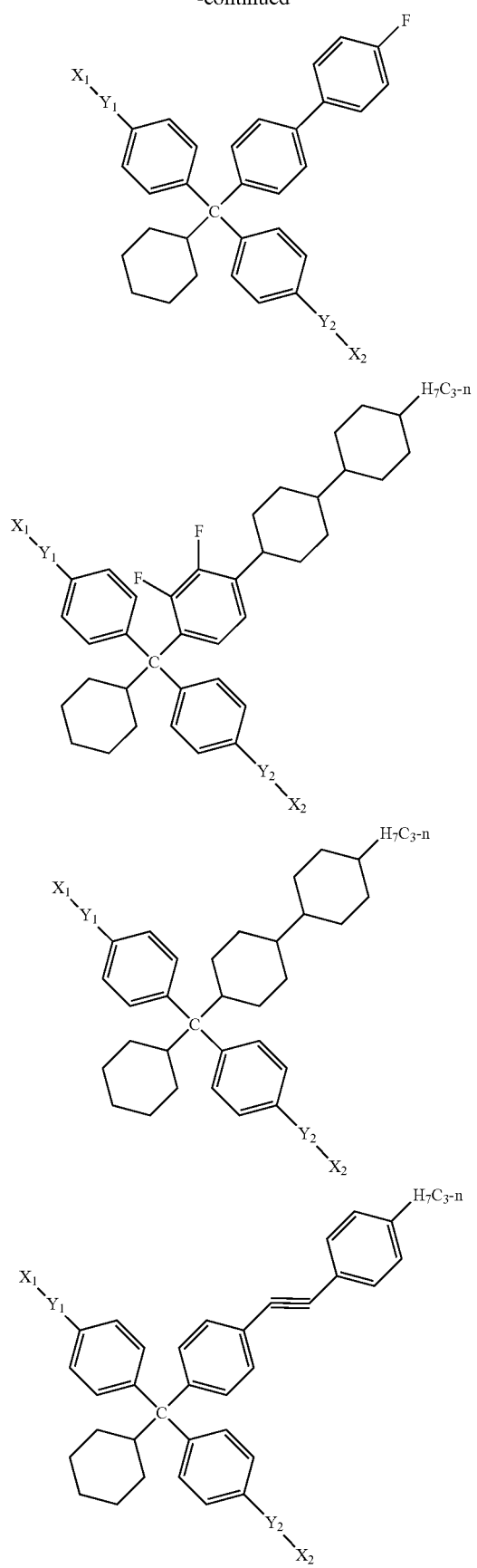
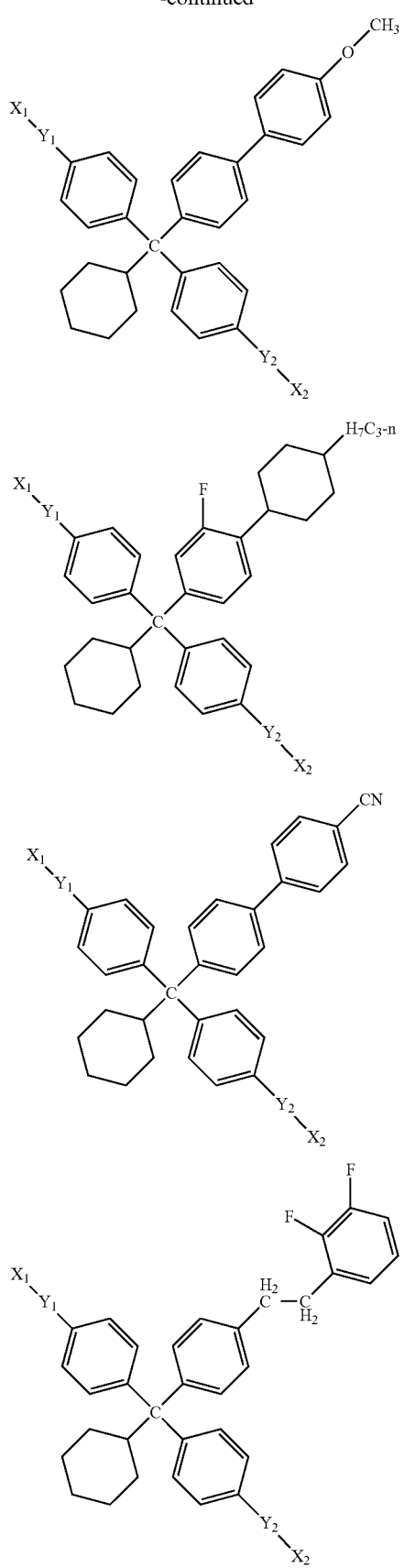

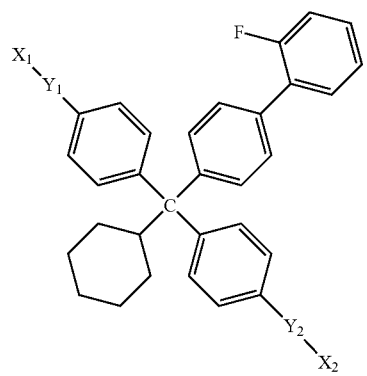
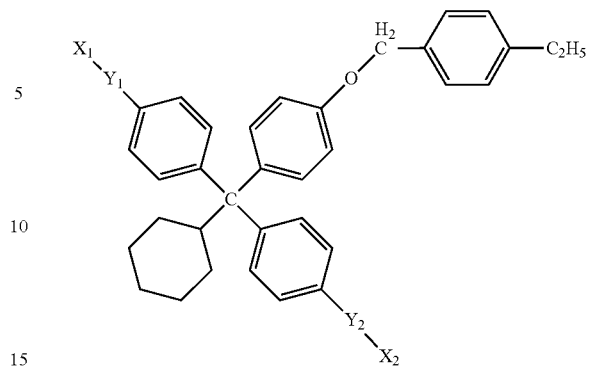
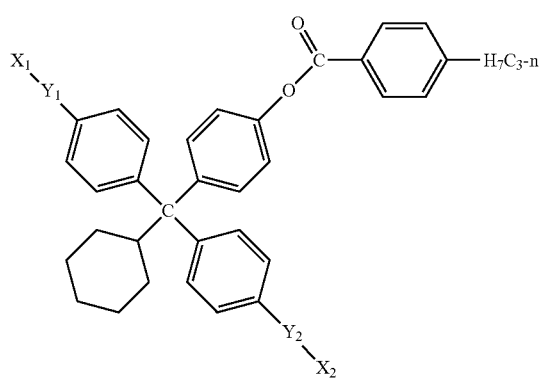
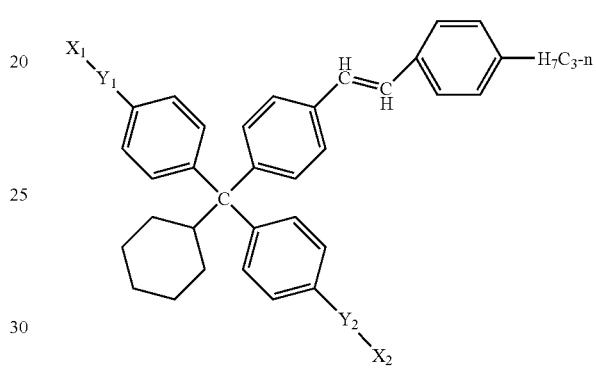
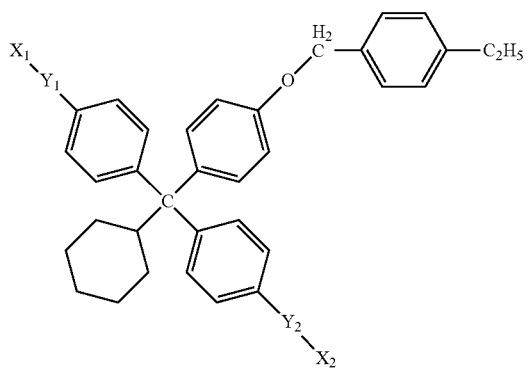
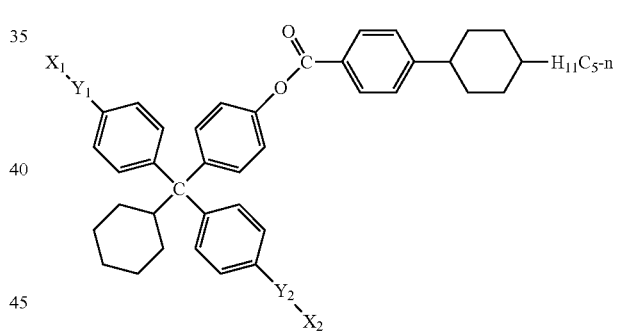
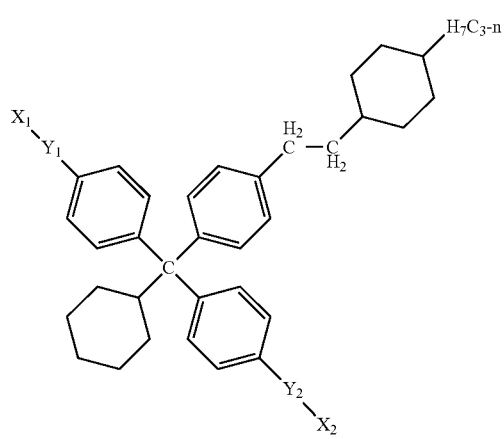
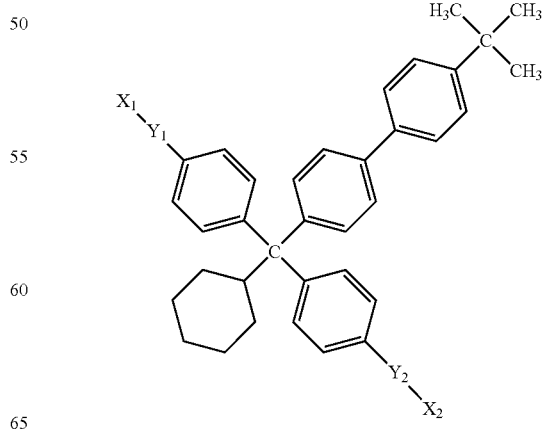

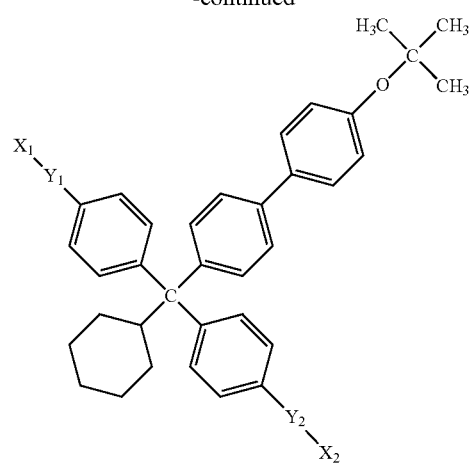
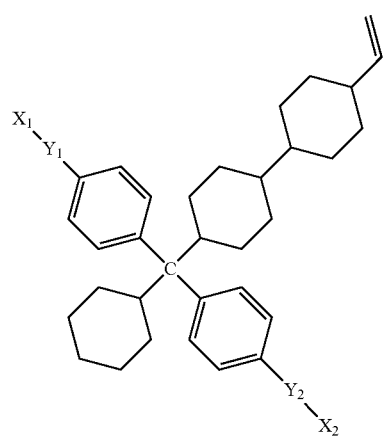
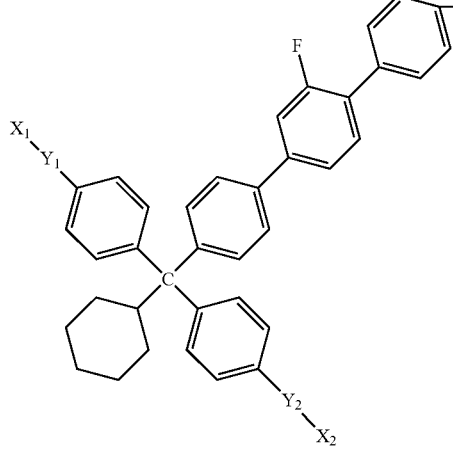
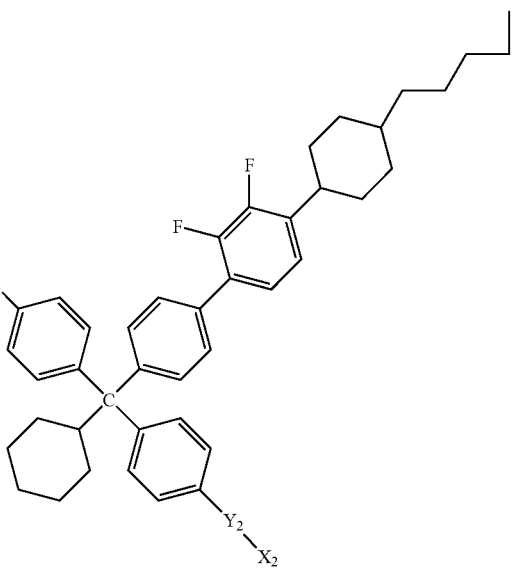
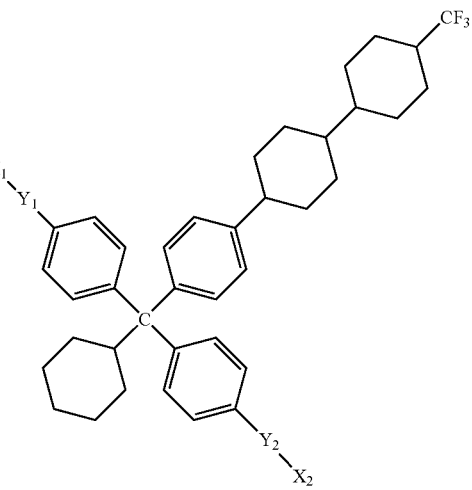
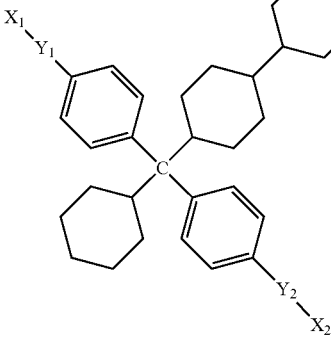

The $X_1$—$Y_1$— and $X_2$—$Y_2$— moieties in the above recited formulae are preferably represented by the structures shown below.

[Formula 9]

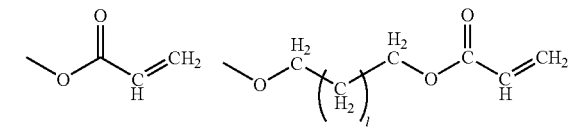

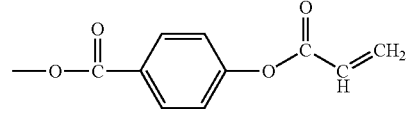

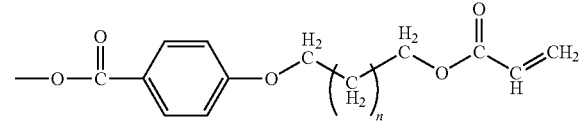

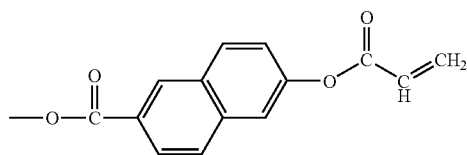

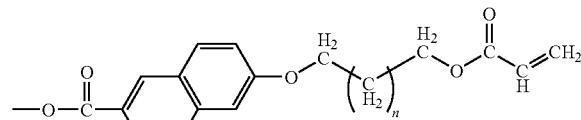

wherein l represents an integer 0 to 7 and n represents an integer 0 to 8.

More specific examples of the polymerizable compound represented by general formula (1) include compound Nos. 1 to 4 below:

[Formula 10]

Compound No. 1

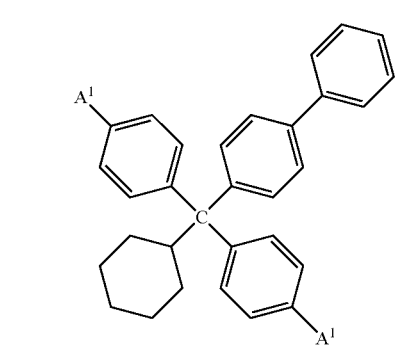

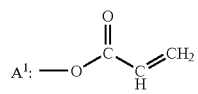

[Formula 11]

Compound No. 2

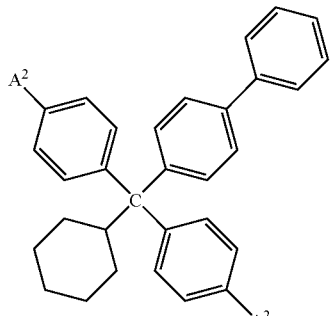

$A^2$: 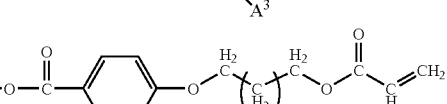

[Formula 12]

Compound No. 3

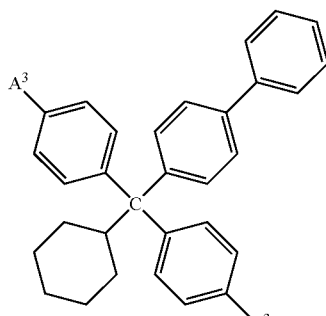

$A^3$: 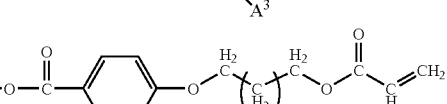

[Formula 13]

Compound No. 4

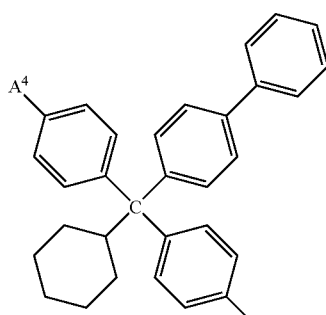

$A^4$: 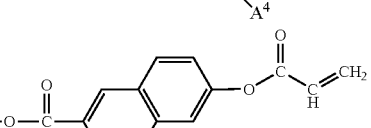

The polymerizable composition of the invention preferably contains the polymerizable compound of general formula (1) in a proportion of 3 to 50 parts, more preferably 5 to 30 parts, by mass per 100 parts by mass of the composition. When the proportion of the polymerizable compound of formula (1) is less than 3 parts, the polymerizable composition tends to have difficulty in alignment control. When the proportion exceeds 50 parts, the polymerizable composition is liable to form crystals on curing, resulting in a non-uniform polymer.

The polymerizable compound of the invention is not restricted by the process of preparation and may be prepared using any known reactions. For example, compound No. 1 is obtainable by the esterification between 1,1-bis(4'-hydroxyphenyl)-1-(1"-biphenyl)-1-cyclohexylmethane and a (meth)acryl halide in the presence of a base. Compound Nos. 2 through 4 may be obtained by mesylating a carboxylic acid compound having a (meth)acryloyl group with methanesulfonyl chloride and esterifying the product with a bisphenol compound (1,1-bis(4'-hydroxyphenyl)-1-(1"-biphenyl)-1-cyclohexylmethane) in the presence of a base.

The polymerizable compound of the invention is compounded with a liquid crystal material to provide a material suitable to form an optical film excellent in heat resistance, solvent resistance, transparency, optical characteristics, and liquid crystal alignment fixing properties. The material is also useful as a liquid crystal alignment layer, a liquid crystal alignment controlling agent, a coating material, a protective film forming material, and so forth.

The polymerizable composition according to the invention will then be described.

The polymerizable composition of the invention is obtained by compounding the polymerizable compound of the invention and a known liquid crystal compound, a known liquid crystal-like compound, or a mixture thereof. Examples of useful liquid crystal compounds are described, e.g., in Japanese Patent Application No. 2005-210868, paras. [0031] to [0058] and [0063] to [0086] and JP 2005-15473A, paras. [0172] through [0314].

Of the liquid crystal compounds preferred are those having a polymerizable functional group, such as a (meth)acryloyloxy group, a fluoroacrylic group, a chloroacrylic group, a trifluoromethylacrylic group, an oxirane ring (epoxy group), an oxetane ring, a styrene compound (styryl group), a vinyl group, a vinyl ether group, a vinyl ketone group, a maleimide group, or a phenylmaleimide group.

The content of the liquid crystal compound in the composition is not limited as long as the effects of the polymerizable compound of the invention are not impaired.

Where necessary, the polymerizable composition of the invention may contain other monomer (a compound having an ethylenically unsaturated bond) and a radical polymerization initiator and be formulated into a solution in a solvent.

Examples of the other monomers include (meth)acrylic esters, such as methyl(meth)acrylate, ethyl(meth)acrylate, propyl(meth)acrylate, butyl(meth)acrylate, sec-butyl(meth)acrylate, tert-butyl(meth)acrylate, hexyl(meth)acrylate, 2-ethylhexyl(meth)acrylate, tetrahydrofurfuryl(meth)acrylate, glycidyl(meth)acrylate, allyl(meth)acrylate, allyloxy(meth)acrylate, cyclohexyl(meth)acrylate, benzyl(meth)acrylate, 1-phenylethyl(meth)acrylate, 2-phenylethyl(meth)acrylate, furfuryl(meth)acrylate, diphenylmethyl(meth)acrylate, naphthyl(meth)acrylate, pentachlorophenyl(meth)acrylate, 2-chloroethyl(meth)acrylate, methyl α-chloro(meth)acrylate, phenyl α-bromo(meth)acrylate, trifluoroethyl(meth)acrylate, tetrafluoropropyl(meth)acrylate, polyethylene glycol di(meth)acrylate, 1,4-butanediol di(meth)acrylate, 1,6-hexanediol di(meth)acrylate, trimethylolpropane tri(meth)acrylate, pentaerythritol tri(meth)acrylate, pentaerythritol tetra(meth)acrylate, dipentaerythritol penta(meth)acrylate, and dipentaerythritol hexa(meth)acrylate; diacetoneacrylamide, styrene, vinyltoluene, and divinylbenzene.

In order to secure heat resistance and optical characteristics of the polymer obtained from the polymerizable composition, the content of the other monomer is preferably not more than 50 parts by mass, more preferably 30 parts by mass or less, per 100 parts by mass of the polymerizable composition.

Examples of the radical polymerization initiator include benzoyl peroxide, 2,2'-azobisisobutyronitrile, benzoin ethers, benzophenones, acetophenones, benzyl ketals, diaryl iodonium salts, triaryl sulfonium salts, diphenyl iodonium tetrafluoroborate, diphenyl iodonium hexafluorophosphonate, diphenyl iodonium hexafluoroarsenate, diphenyl iodonium tetra(pentafluorophenyl)borate, 4-methoxyphenyl phenyl iodonium tetrafluoroborate, 4-methoxyphenyl phenyl iodonium hexafluorophosphonate, 4-methoxyphenyl phenyl iodonium hexafluoroarsenate, bis(4-tert-butylphenyl)iodonium diphenyl iodonium tetrafluoroborate, bis(4-tert-butylphenyl)iodonium diphenyl iodonium hexafluoroarsenate, bis(4-tert-butylphenyl)iodonium diphenyl iodonium trifluoromethanesulfonate, triphenyl sulfonium hexafluorophosphonate, triphenyl sulfonium hexafluoroarsenate, triphenyl sulfonium tetra(pentafluorophenyl)borate, 4-methoxyphenyl diphenyl sulfonium tetrafluoroborate, 4-methoxyphenyl diphenyl sulfonium hexafluorophosphonate, 4-methoxyphenyl diphenyl sulfonium hexafluoroarsenate, 4-methoxyphenyl diphenyl sulfonium trifluoromethanesulfonate, 4-methoxyphenyl diphenyl sulfonium triphenyl sulfonium tetra(pentafluorophenyl)borate, 4-phenylthiophenyl diphenyl sulfonium tetrafluoroborate, 4-phenylthiophenyl diphenyl sulfonium hexafluorophosphonate, 4-phenylthiophenyl diphenyl sulfonium hexafluoroarsenate, p-methoxyphenyl-2,4-bis(trichloromethyl)-s-triazine, 2-(p-butoxystyryl)-s-triazine, 2-(p-butoxystyryl)-5-trichloromethyl-1,3,4-oxadiazole, 9-phenylacridine, 9,10-dimethylbenzphenazine, benzophenone/Michler's ketone, hexaarylbiimidazole/mercaptobenzimidazole, benzyl dimethyl ketal, thioxanthone/amine, triarylsulfonium hexafluorophosphates, and bis(2,4,6-trimethylbenzoyl)phenylphosphine oxide.

A combination of the radical polymerization initiator and a sensitizer is also preferred. Examples of useful sensitizers are thioxanthone, phenothiazine, chlorothioxanthone, xanthone, anthracene, diphenylanthracene, and rubrene. The amount of the radical polymerization initiator or the combination of the radical polymerization initiator and the sensitizer, if added, is preferably 10 parts or less, more preferably 5 parts or less, even more preferably 0.1 to 3 parts, by mass per 100 parts by mass of the polymerizable composition.

Examples of the solvent include benzene, toluene, xylene, mesitylene, n-butylbenzene, diethylbenzene, tetralin, methoxybenzene, 1,2-dimethoxybenznee, ethylene glycol dimethyl ether, diethylene glycol dimethyl ether, acetone, methyl ethyl ketone, methyl isobutyl ketone, cyclopentanone, cyclohexanone, ethyl acetate, methyl lactate, ethyl lactate, ethylene glycol monomethyl ether acetate, propylene glycol monomethyl ether acetate, propylene glycol monoethyl ether acetate, γ-butyrolactone, 2-pyrrolidone, N-methyl-2-pyrrolidone, dimethylformamide, chloroform, dichloromethane, carbon tetrachloride, dichloroethane, trichloroethylene, tetrachloroethylene, chlorobenzene, t-butyl alcohol, diacetone alcohol, glycerol, monoacetylene, ethylene glycol, triethylene glycol, hexylene glycol, ethylene glycol monomethyl ether, ethyl cellosolve, and butyl cellosolve. The solvent may be a single compound or a mixture of compounds. A solvent having a boiling point of 60° to 250° C., particularly a solvent having a boiling point of 60° to 180° C. is preferred. A solvent whose boiling point is lower than 60° C. is liable to vaporize during application, resulting in thickness unevenness. A solvent whose boiling point is higher than 250° C. tends to remain even after solvent removal under reduced pressure or induce thermal polymerization when treated in high temperature, resulting in reduced aligning properties.

The polymerizable composition may further contain an optically active compound to provide a polymer having inside a helical structure of the liquid crystal skeleton, namely, a polymer having a cholesteric liquid crystal phase fixed therein. In this embodiment, the amount of the optically active compound to be added is preferably 0.1 to 100 parts, more preferably 1 to 50 parts, by mass per 100 parts by mass of the polymerizable composition except the solvent. Examples of usable optically active compounds are shown below.

[Formula 14]

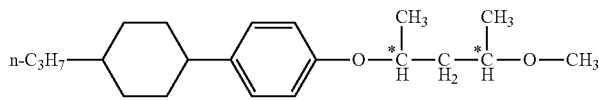

[Formula 15]

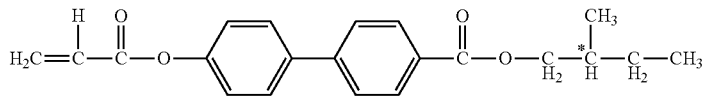

[Formula 16]

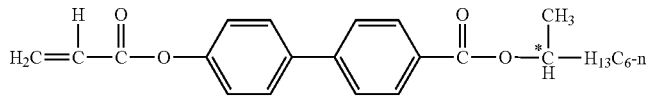

[Formula 17]

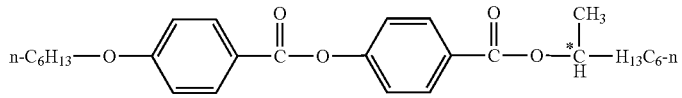

[Formula 18]

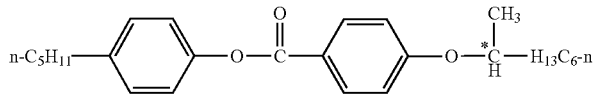

[Formula 19]

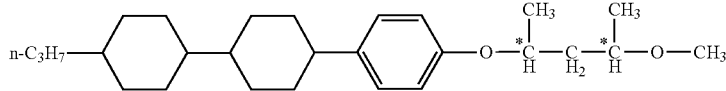

[Formula 20]

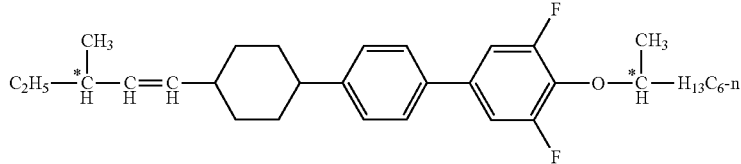

[Formula 21]

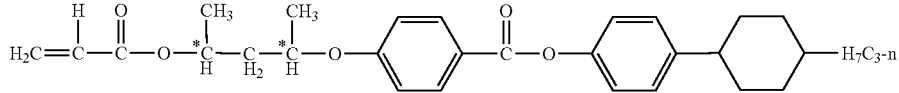

[Formula 22]

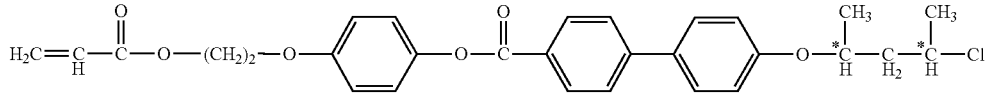

[Formula 23]

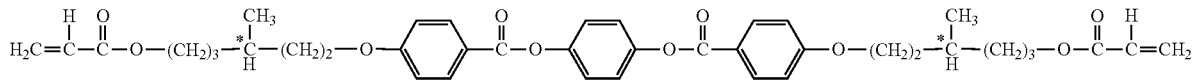

-continued
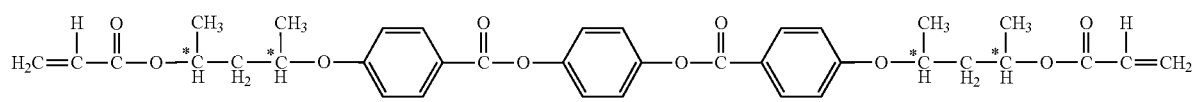
[Formula 24]
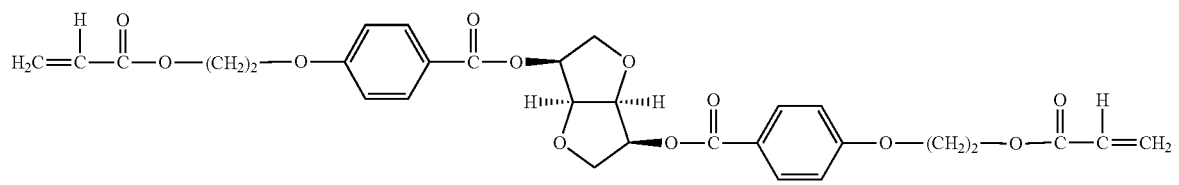
[Formula 25]
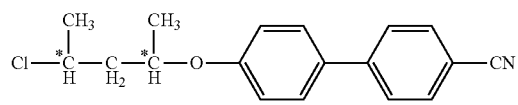
[Formula 26]
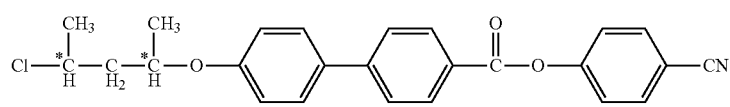
[Formula 27]
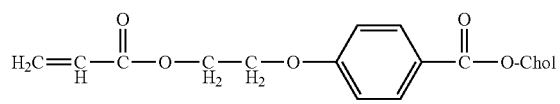
[Formula 28]
Chol is cholesteryl group shown below
Chol is identical with that in [formula 28] shown above
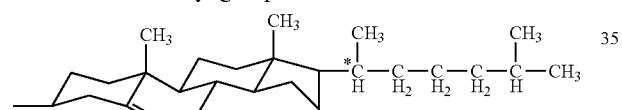
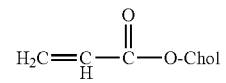
[Formula 30]
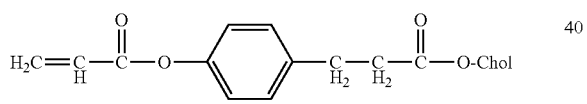
[Formula 29]
Chol is identical with that in [formula 28] shown above
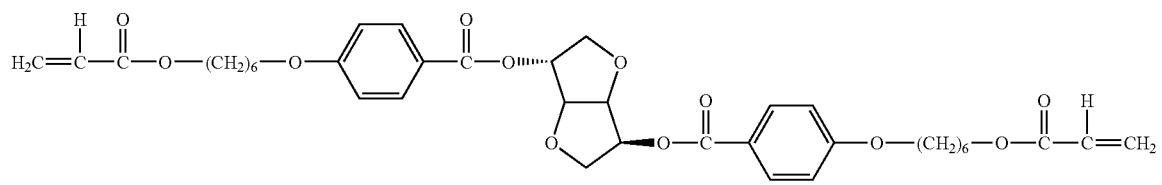
[Formula 31]
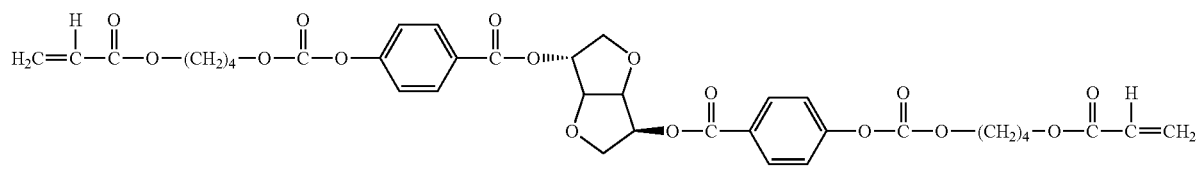
[Formula 32]

The polymerizable composition may further contain a surfactant that produces an excluded volume effect over the interface with air. The surfactant is preferably selected from those effective in facilitating applying the polymerizable composition to a substrate or controlling the alignment of the liquid crystal phase. Such surfactants include quaternary ammonium salts, alkylamine oxides, polyamine derivatives, polyoxyethylene-polyoxypropylene condensates, polyethylene glycol and esters thereof, sodium laurylsuifate, ammonium laurylsulfate, amine laurylsulfates, alkyl-substituted aromatic sulfonates, alkylphosphates, perfluoroalkylsulfonates, perfluoroalkylcarboxylates, perfluoroalkyl ethylene oxide adducts, and perfluoroalkyltrimethylammonium salts. A preferred amount of the surfactant to be used depends on the kind of the surfactant, the compounding ratio of the composition, and the like but generally ranges from 0.01 to 5 parts, more preferably 0.05 to 1 part, by mass per 100 parts by mass of the polymerizable composition.

Additives may be added to the polymerizable composition where needed to improve characteristics of the composition, including functional compounds, such as storage stabilizers, antioxidants, ultraviolet absorbers, infrared absorbers, fine particles of organic, inorganic or other materials, and polymers.

The storage stabilizers serve to improve storage stability of the composition, including hydroquinone, hydroquinone monoalkyl ethers, tert-butyl catechols, pyrogallols, thiophenols, nitro compounds, 2-naphtylamines, and 2-hydroxynaphthalenes. The amount of the storage stabilizer, if used, is preferably 1 part or less, more preferably 0.5 parts or less, by mass per 100 parts by mass of the polymerizable composition.

Any known antioxidants may be used, including hydroquinone, 2,6-di(tert-butyl)-p-cresol, 2,6-di(tert-butyl)phenol, triphenyl phosphite, and trialkyl phosphites.

Any known UV absorbers may be used, including salicylic ester compounds, benzophenol compounds, benzotriazole compounds, cyanoacrylate compounds, and nickel complex salt compounds.

The fine particles may be used to adjust the optical (refractive index, $\Delta n$) anisotropy or enhance the strength of the polymer. The fine particles may be of organic, inorganic or metallic materials. The particle size is preferably 0.001 to 0.1 μm, more preferably 0.001 to 0.05 μm, to prevent flocculation. The particle size distribution is preferably narrow. The amount of the particles, if used, is preferably 0.1 to 30 parts by mass per 100 parts by mass of the polymerizable composition.

The inorganic materials include ceramics, fluorophlogopite, fluorotetrasilicic mica, taeiniolite, fluorovermiculite, fluorohectorite, hectorite, saponite, stevensite, montmorillonite, heidellite, kaolinite, fraipontite, ZnO, $TiO_2$, $CeO_2$, $Al_2O_3$, $Fe_2O_3$, $ZrO_2$, $MgF_2$, $SiO_2$, $SrCO_3$, $Ba(OH)_2$, $Ca(OH)_2$, $Ga(OH)_3$, $Al(OH)_3$, $Mg(OH)_2$ and $Zr(OH)_4$. Fine particles having optical anisotropy exemplified by needle-like crystals of calcium carbonate may be used to adjust the optical anisotropy of the polymer.

The organic materials include carbon nanotube, fullerene, dendrimer, polyvinyl alcohol, polymethacrylate, and polyimide.

The polymer as an additive is preferably selected from those serving for adjusting the electric characteristics or alignment characteristics of the polymer of the invention and soluble in the above recited solvent. Examples of such a polymer include polyamide, polyurethane, polyurea, polyepoxide, polyester, and polyester polyol.

The polymer of the present invention will now be described.

The polymer of the invention is obtained by dissolving the polymerizable composition of the invention in a solvent, applying the resulting solution of the polymerizable composition to a substrate, removing the solvent from the coating film in which the liquid crystal molecules of the polymerizable composition have been aligned, and then irradiating the coating film with energy rays to cause polymerization.

Examples of preferred substrates include, but are not limited to, plates of glass, polyethylene terephthalate, polycarbonate, polyimide, polyamide, polymethyl methacrylate, polystyrene, polyvinyl chloride, polytetrafluoroethylene, cellulose, silicone, cycloolefin polymers, or calcite, and a reflector plate. It is preferred to use the above described substrate which has formed thereon a polyimide alignment layer or a polyvinyl alcohol alignment layer.

The polymerizable composition solution can be applied to the substrate by any known coating techniques including curtain coating, extrusion coating, roll coating, spin coating, dipping, bar coating, spraying, slide coating, printing, and casting. The thickness of the polymer film is decided as appropriate to the end use, and is preferably 0.001 to 30 μm, more preferably 0.001 to 10 μm, even more preferably 0.005 to 8 μm.

The liquid crystal molecules in the polymerizable composition are aligned by, for example, previously subjecting the substrate to an alignment treatment. Such an alignment treatment of the substrate is preferably carried out by providing a liquid crystal alignment layer, such as a polyimide alignment layer or a polyvinyl alcohol alignment layer, on the substrate, followed by rubbing the alignment layer or a like operation. Molecular alignment may also be achieved by applying a magnetic field or an electric field to the coating film of the polymerizable composition on the substrate.

The polymerizable composition can be polymerized by known processes using heat or electromagnetic waves. Electromagnetic radiation-induced polymerization reactions include radical polymerization, anionic polymerization, cationic polymerization, coordination polymerization, and living polymerization. It is easy with electromagnetic radiation to effect polymerization under a condition in which the polymerizable composition exhibits a liquid crystal phase. Crosslinking reaction in a magnetic field or an electric field is also preferred. The liquid crystal (co)polymer formed on the substrate may be used as such or, when needed, stripped off the substrate or transferred onto a different substrate.

The kinds of light include ultraviolet light, visible light, and infrared light. Electromagnetic radiation, such as electron beams and X rays, may also be used. Usually, ultraviolet light or visible light is preferred. A preferred wavelength range is from 150 to 500 nm, more preferably from 250 to 450 nm, even more preferably 300 to 400 nm. Light sources include low pressure mercury lamps (e.g., bactericidal lamps, fluorescent chemical lamps, and black lights), high pressure discharge lamps (e.g., high pressure mercury lamps and metal halide lamps), and short arc discharge lamps (ultrahigh pressure mercury lamps, xenon lamps, and mercury xenon lamps), with ultrahigh pressure mercury lamps being preferred. The polymerizable composition may be irradiated with the light as emitted from a light source or a light ray of a specific wavelength or light rays of a specific wavelength range selected through a filter. A preferred irradiation energy density is 2 to 5000 $mJ/cm^2$, more preferably 10 to 3000 $mJ/cm^2$, even more preferably 100 to 2000 $mJ/cm^2$. A preferred illuminance is 0.1 to 5000 $mW/cm^2$, more preferably 1 to 2000 $mW/cm^2$. The temperature during irradiation may be decided so that the polymerizable composition may have a liquid crystal phase and is preferably 100° C. or lower. At 100° C. or higher temperatures, thermal polymerization can occur, resulting in a failure to obtain satisfactory alignment.

The polymer of the invention is useful as a molded article with optical anisotropy. Such a molded article finds applications for optical compensation, such as a retardation film (e.g., a ½-wave plate or a ¼-wave plate), a polarizer, a dichroic polarizing plate, a liquid crystal alignment layer, an alignment controlling film, an antireflective film, a selectively reflecting film, and a viewing angle compensation film. The molded article also finds use as an optical lens, such as a liquid crystal lens or a microlens, and an information recording material, such as a polymer dispersed liquid crystal (PDLC) type e-paper or a digital paper.

The present invention will now be illustrated in greater detail by way of Synthetic Examples and Examples, but it should be understood that the invention is not deemed to be limited thereto. Synthesis Examples i to 4 illustrate preparation of the compounds according to the invention. Preparation Example 1 shows preparation of the polymerizable compositions according to the invention and preparation of polymers using the polymerizable compositions. Examples 1 and 2 illustrate preparation of the polymer according to the invention and the results of evaluation of the polymer.

Synthesis Example 1

Preparation of Compound No. 1

Compound No. 1 was synthesized as follows in accordance with reaction scheme:

[Formula 33]

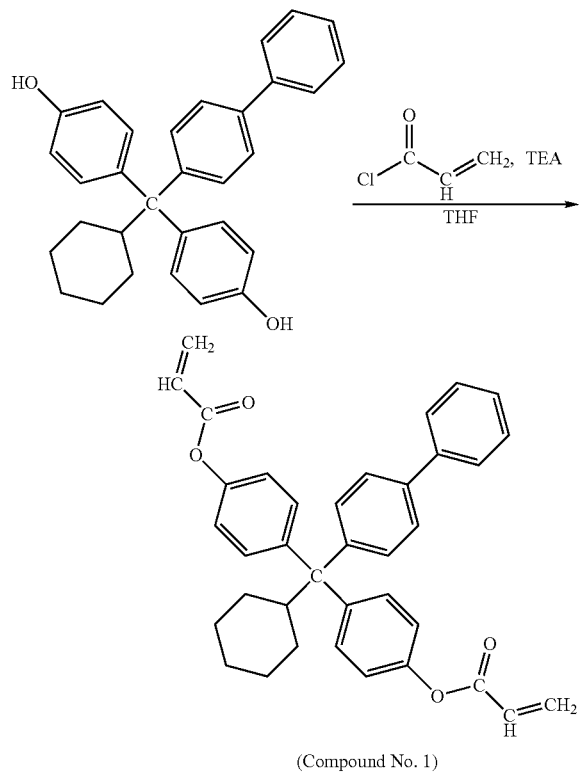

(Compound No. 1)

TEA: triethylamine
THF: tetrahydrofuran

In a nitrogen stream, 2.0 g (4.6 mmol) of 1,1-bis(4'-hydroxyphenyl)-1-(1"-biphenyl)-1-cyclohexylmethane, 1.11 g (11.0 mmol) of triethylamine (TEA), and 8.4 ml of tetrahydrofuran (THF) were put into a reaction flask. After the mixture was cooled with ice, 1.0 g (11.1 mmol) of acryloyl chloride was added thereto dropwise at 25° C. or lower, followed by stirring at room temperature (25° to 30° C.) for 2.5 hours. A 1 wt % aqueous solution of phoshoric acid and ethyl acetate were added to the reaction mixture to conduct oil-water separation. The organic layer was extracted and washed successively twice with ion exchanged water and once with a saturated aqueous solution of sodium chloride. The organic layer was dried over magnesium sulfate and filtered, and the filtrate was concentrated under reduced pressure to give a pale yellow oily substance. Purification of the crude product by silica gel column chromatography (developing solvent: toluene) yielded 2.0 g (80%; purity: 99.6%) of white crystals, which were identified to be compound No. 1 as a result of analyses. The results of the analyses are shown below.

(1) $^1$H-NMR (400 MHz, CDCl$_3$) (ppm)

1.26 (3H, br), 1.52-1.63 (5H, m), 2.23 (2H, d), 4.00 (1H, s), 5.98 (2H, d), 6.29 (2H, dd), 6.57 (2H, d), 6.95 (4H, d), 7.01 (2H, d), 7.09 (4H, d), 7.34 (1H, t), 7.45 (2H, t), 7.50 (2H, d), 7.66 (2H, d)

(2) $^{13}$C-NMR (400 MHz, CDCl$_3$) (ppm)

22.16, 26.30, 36.59, 46.12, 120.40, 125.71, 126.87, 127.10, 127.96, 128.72, 129.0, 130.42, 131.29, 132.42, 138.36, 138.79, 140.37, 140.59, 149.02, 164.44

(3) IR (KBr tablet method) (cm$^{-1}$)

697, 741, 762, 800, 846, 870, 902, 983, 1018, 1067, 1147, 1250, 1295, 1403, 1452, 1469, 1504, 1602, 1634, 1740, 1949, 2858, 2933, 3031, 3464

(4) Thermoanalysis

Exothermic peaks were observed at 149.4° C. and 196.2° C. in differential scanning calorimetry using DSC-6200 from Seiko Instruments Inc. under conditions of a nitrogen atmosphere (50 ml/min), a heating rate of 5° C./min, and a measuring temperature of from room temperature up to 230° C.

Synthesis Example 2

Preparation of Compound No. 2

Compound No. 2 was synthesized as follows in accordance with reaction scheme:

[Formula 34]

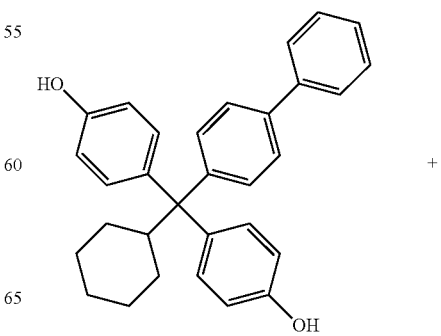

-continued

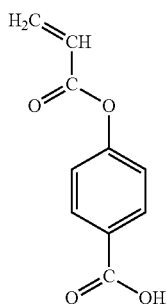

MsCl, (i-Pr)²NEt, DMAP
———————————→
THF

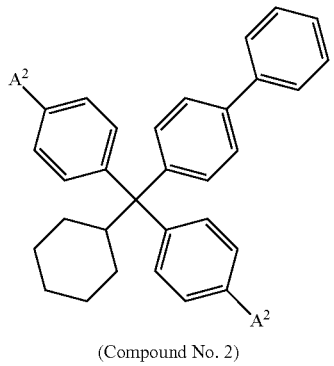

(Compound No. 2)

MsCl: methanesulfonyl chloride
(i-Pr) ²NEt: diisopropylethylamine
DMAP: 4-dimethylaminopyridine

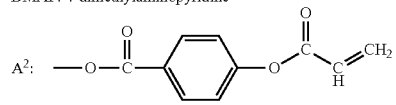

In a nitrogen stream, 1.3 g (11.4 mmol) of methanesulfonyl chloride (MsCl) and 9.1 ml of tetrahydrofuran (THF) were put into a reaction flask. The mixture was cooled to −30° C., and a solution of 2.2 g (11.5 mmol) of acryloyloxybenzoic acid and 3.3 g (25.6 mmol) of diisopropylethylamine ((i-Pr)²NEt) in 16.4 ml of tetrahydrofuran (THF) was added thereto dropwise. The mixture was warmed up to −10° C., at which it was stirred for 40 minutes to conduct reaction. Then, a solution of 2.0 g (4.6 mmol) of 1,1-bis(4'-hydroxyphenyl)-1-(1"-biphenyl)-1-cyclohexylmethane and 56 mg (0.46 mmol) of 4-dimethylaminopyridine (DMAP) in 18.0 ml of tetrahydrofuran (THF) was dropwise added to the reaction mixture. The mixture was warmed up to 0° C., at which it was allowed to react for 1 hour. After confirming completion of the reaction by thin layer chromatography, ion-exchanged water and ethyl acetate were added to the reaction mixture to conduct oil-water separation. The organic layer was extracted and washed successively twice with ion exchanged water and once with a saturated aqueous solution of sodium chloride. The organic layer was dried over magnesium sulfate and filtered, and the filtrate was concentrated under reduced pressure to give a pale yellow oily substance. Purification of the crude product by silica gel column chromatography (developing solvent: toluene) yielded 1.57 g (43%; purity: 99.9%) of white crystals, which were identified to the compound No. 2 as a result of analyses. The results of analyses are shown below.

(1) ¹H-NMR (400 MHz, CDCl₃) (ppm)

1.25-1.28 (3H, m), 1.56-1.65 (5H, m), 2.27 (2H, d), 4.06 (1H, s), 6.07 (2H, dd), 6.35 (2H, dd), 6.65 (2H, dd), 7.03-7.06 (6H, m), 7.16 (4H, d), 7.29 (4H, d), 7.34 (1H, t), 7.45 (2H, t), 7.54 (2H, d), 7.68 (2H, dd), 8.22-8.25 (4H, m)

(2) ¹³C-NMR (400 MHz, CDCl₃) (ppm)

22.19, 26.32, 36.65, 46.17, 65.32, 120.58, 121.76, 125.76, 126.89, 127.11, 127.18, 127.47, 128.72, 130.45, 131.40, 131.76, 133.37, 138.41, 138.93, 140.38, 140.60, 149.31, 154.65, 163.87, 164.27

(3) IR (KBr tablet method) (cm⁻¹)

697, 741, 761, 798, 883, 904, 1014, 1074, 1134, 1403, 1506, 1602, 1739, 2857, 2933, 3032

(4) Thermoanalysis

Exothermic peaks were observed at 167.2° C. and 217.7° C. in differential scanning calorimetry using DSC-6200 from Seiko Instruments Inc. under conditions of a nitrogen atmosphere (50 ml/min), a heating rate of 10° C./min, and a measuring temperature of from room temperature up to 300° C.

Synthesis Example 3

Preparation of Compound No. 3

Compound No. 3 was synthesized as follows in accordance with reaction scheme:

[Formula 35]

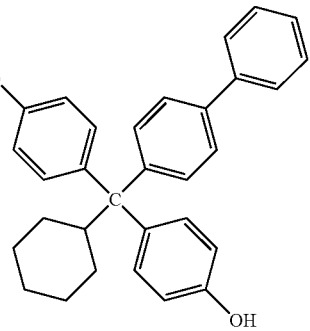

+

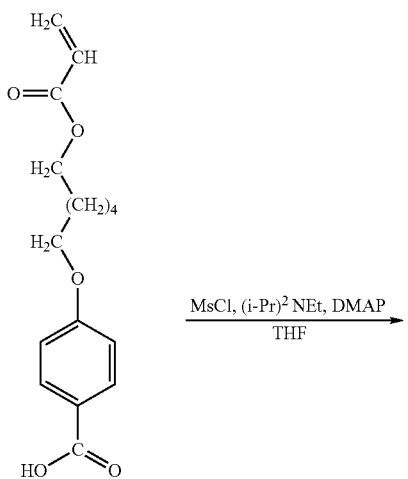

MsCl, (i-Pr)² NEt, DMAP
———————————→
THF

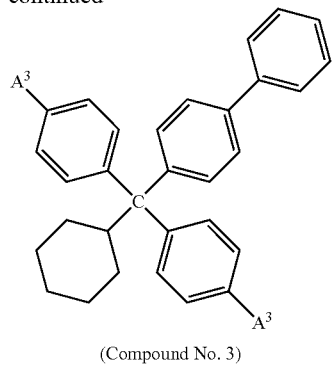

(Compound No. 3)

MsCl: methanesulfonyl chloride
(i-Pr)$^2$NEt: diisopropylethylamine
THF: tetrahydrofuran
DMAP: 4-dimethylaminopyridine

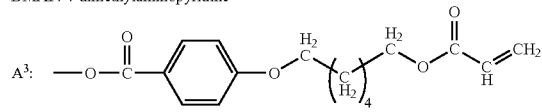

In a nitrogen stream, 1.3 g (11.4 mmol) of methanesulfonyl chloride (MsCl) and 9.1 ml of tetrahydrofuran (THF) were put into a reaction flask. The mixture was cooled to −30° C., and a solution of 3.0 g (9.8 mmol) of 4-acryloyloxyhexyloxybenzoic acid and 3.3 g (25.6 mmol) of diisopropylethylamine ((i-Pr)$^2$NEt) in 16.4 ml of tetrahydrofuran (THF) was added thereto dropwise. The mixture was warmed up to −10° C., at which it was stirred for 40 minutes to conduct reaction. Then, a solution of 2.0 g (4.6 mmol) of 1,1-bis(4'-hydroxyphenyl)-1-(1''-biphenyl)-1-cyclohexylmethane and 56 mg (0.46 mmol) of 4-dimethylaminopyridine (DMAP) in 18.0 ml of tetrahydrofuran (THF) was dropwise added to the reaction mixture. The mixture was warmed up to 0° C., at which it was allowed to react for 2 hours. After confirming completion of the reaction by thin layer chromatography, ion-exchanged water and ethyl acetate were added to the reaction mixture to conduct oil-water separation. The organic layer was extracted and washed twice with ion exchanged water. The organic layer was dried over magnesium sulfate and filtered, and the filtrate was concentrated under reduced pressure to give a pale yellow oily substance. Purification of the crude product by silica gel column chromatography (developing solvent: toluene) yielded 0.7 g (14%; purity: 96.5%) of a colorless oily substance, which was identified to be compound No. 3 as a result of analyses. The results of analyses are shown below.

(1) $^1$H-NMR (400 MHz, CDCl$_3$) (ppm)

1.26-1.28 (3H, m), 1.47-1.73 (5H, m), 1.47-1.54 (8H, m), 1.73 (4H, q), 2.26 (2H, d), 4.03-4.06 (1H, m), 4.04 (4H, t), 4.18 (4H, t), 5.81 (2H, dd), 6.13 (2H, dd), 6.41 (2H, dd), 6.96 (4H, d), 7.30 (4H, d), 7.02-7.06 (2H, m), 7.32 (1H, t), 7.47 (2H, t), 7.53 (2H, d), 7.68 (2H, d), 8.12 (2H, d)

(2) $^{13}$C-NMR (400 MHz, CDCl$_3$) (ppm)

22.20, 25.67, 25.70, 26.35, 28.51, 28.95, 30.28, 36.65, 46.17, 64.44, 68.02, 114.20, 120.68, 121.70, 125.72, 126.89, 127.08, 128.52, 128.72, 130.49, 130.58, 131.32, 132.22, 138.33, 138.67, 140.46, 140.63, 149.50, 163.32, 164.83, 166.31

(3) IR (KBr tablet method) (cm$^{-1}$)

694, 741, 763, 847, 1008, 1070, 1165, 1205, 1255, 1408, 1510, 1604, 1726, 2937

Synthesis Example 4

Preparation of Compound No 4

Compound No. 4 was synthesized as follows in accordance with reaction scheme:

[Formula 36]

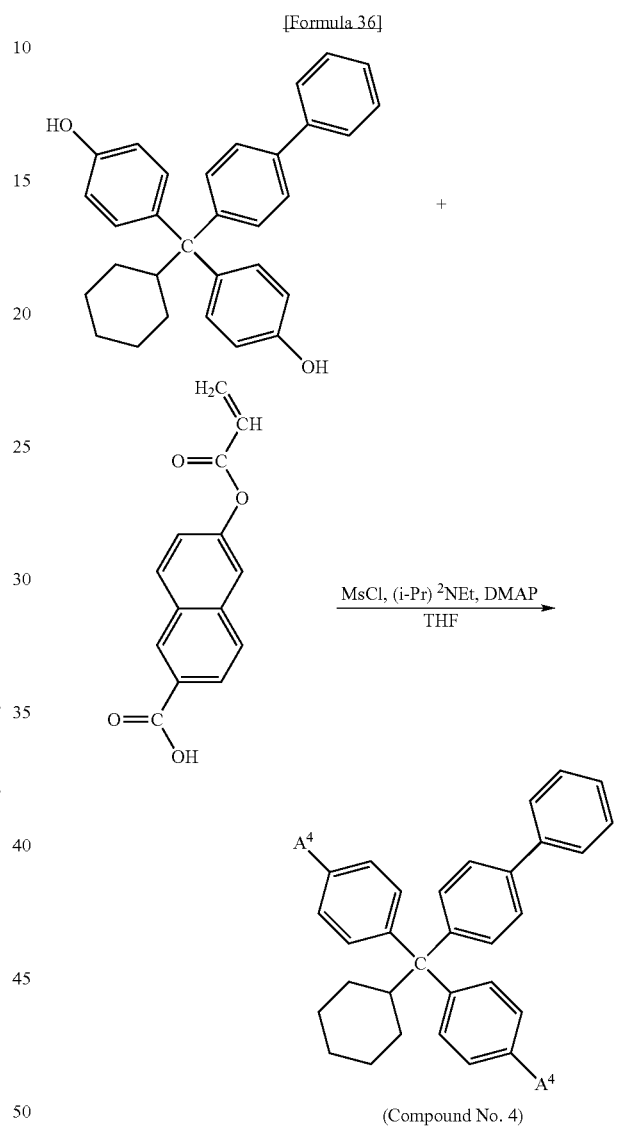

(Compound No. 4)

MsCl: methanesulfonyl chloride
(i-Pr)$^2$NEt: diisopropylethylamine
DMAP: 4-dimethylaminopyridine
THF: tetrahydrofuran

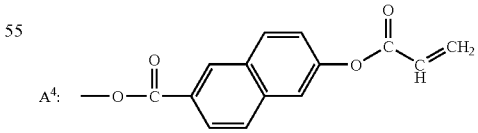

In a nitrogen stream, 1.3 g (11.4 mmol) of methanesulfonyl chloride (MsCl) and 9.1 ml of tetrahydrofuran (THF) were put into a reaction flask. The mixture was cooled to −30° C., and a solution of 2.8 g (11.6 mmol) of acryloyloxynaphthoic acid and 3.3 g (25.6 mmol) of diisopropylethylamine in 16.4 ml of tetrahydrofuran (THF) was added thereto dropwise. The mixture was warmed up to −10° C., at which it was stirred for 40 minutes to conduct reaction. Then, a solution of 2.0 g (4.6 mmol) of 1,1-bis(4'-hydroxyphenyl)-1-(1''-biphenyl)-1-cyclohexylmethane and 56 mg (0.46 mmol) of 4-dimethylaminopyridine (DMAP) in 18.0 ml of tetrahydrofuran (THF) was dropwise added to the reaction mixture. The mixture was warmed up to 0° C., at which it was allowed to react for 1 hour. After confirming completion of the reaction by thin layer chromatography, ion-exchanged water and ethyl acetate were added to the reaction mixture to conduct oil-water separation. The organic layer was extracted and washed successively twice with ion exchanged water and once with a saturated aqueous solution of sodium chloride. The organic layer was dried over magnesium sulfate and filtered, and the filtrate was concentrated under reduced pressure to give a pale yellow oily substance. Purification of the crude product by silica gel column chromatography (developing solvent: toluene) yielded 2.2 g (54%; purity: 99.2%) of white crystals, which were identified to be compound No. 4 as a result of analyses. The results of analyses are shown below.

(1) $^1$H-NMR (400 MHz, CDCl$_3$) (ppm)

1.25-1.30 (3H, m), 1.56-1.65 (5H, m), 2.27 (2H, d), 4.06 (1H, s), 6.07 (2H, dd), 6.38 (2H, dd), 6.67 (2H, dd), 7.07 (2H, d), 7.11 (4H, d), 7.20 (4H, d), 7.33 (2H, t), 7.37 (2H, dd), 7.45 (1H, t), 7.55 (2H, d), 7.67-7.69 (4H, m), 7.90 (2H, d), 8.02 (2H, d), 8.20 (2H, dd), 8.77 (2H, s)

(2) $^{13}$C-NMR (400 MHz, CDCl$_3$) (ppm)

22.19, 26.32, 36.65, 46.17, 65.32, 120.58, 121.76, 126.89, 127.11, 127.18, 127.47, 128.72, 130.45, 131.40, 131.76, 133.37, 138.41, 138.93, 140.38, 140.60, 149.31, 154.65, 163.87, 164.27

(3) IR (KBr tablet method) (cm$^{-1}$)

696, 740, 762, 802, 879, 933, 982, 1017, 1063, 1182, 1275, 1338, 1402, 1473, 1504, 1631, 1736, 2857, 2933, 3031

(4) Thermoanalysis

An exothermic peak was observed at 178.5° C. in differential scanning calorimetry using DSC-6200 from Seiko Instruments Inc. under conditions of a nitrogen atmosphere (50 ml/min), a heating rate of 10° C./min, and a measuring temperature of from 40° C. to 300° C.

Preparation Example 1

Production of Polymers

A polymer was produced in accordance with the following procedures; (1) preparation of a sample, (2) preparation of a substrate, and (3) application to the substrate.

(1) Preparation of Polymerization Composition Solution

Each of the polymerizable compositions shown in Table 1 below weighing 1.0 g was dissolved in 4.0 g of a solvent (2-butanone), and 0.03 g of a radical polymerization initiator (N-1919, from ADEKA Corp.) was added and completely dissolved therein. The solution was filtered through a filter with a pore size of 0.45 µm to prepare a polymerizable composition solution.

(2) Preparation of Substrate

A glass plate was cleaned with a mild detergent, rinsed with pure water, and dried. A 5% aqueous solution of polyvinyl alcohol was uniformly applied to the glass plate with a spin coater and dried at 100° C. for 3 minutes. The polyvinyl alcohol film thus formed on the substrate was rubbed with a rayon cloth in a given direction to prepare a substrate.

(3) Application to Substrate

Each of the polymerizable composition solutions prepared in (1) above was applied to the substrate prepared in (2) above with a spin coater. The speed and time of rotation of the spin coater were adjusted so as to give a coating film thickness of about 1.0 µm. The coating film was dried on a hot plate at 100° C. for 3 minutes, allowed to cool at room temperature for 3 minutes, and irradiated with light of a high pressure mercury lamp (120 W/cm) for 20 seconds to polymerize and cure.

Examples 1 and 2 and Comparative Examples 1 to 3

The polymers obtained in Preparation Example 1 were tested for evaluation as follows. The results obtained are shown in Table 1.

(1) Retardation (R)

The retardation (R) at 546 nm of the polymers obtained in Preparation Example 1 was determined in accordance with the Senarmont method using a polarizing microscope at room temperature (25° C.).

(2) Thickness (d)

The thickness (d) of the resulting polymer film was measured with a contact stylus profilometer (Dektak6M from Ulvac Inc.) at room temperature (25° C.).

(3) Surface Condition

The surface of the resulting polymer film was observed with the naked eye and graded "good" (smooth surface), "medium" (non-uniformity on part of the surface), or "poor" (rough surface).

(4) Homogeneity

Homogeneity of the polymer film was evaluated using a polarizing microscope. A sample was mounted on the rotating stage between crossed polarizers, and the stage was rotated to observe the alignment state of the polymer, from which the film homogeneity was evaluated. A sample showing uniform alignment was rated "good", non-uniform alignment "medium", or no alignment due to, e.g., crystallization "poor".

TABLE 1

| | Example | | Comp. Example | |
|---|---|---|---|---|
| | 1 | 2 | 1 | 2 |
| Polymerizable Composition (part by mass): | | | | |
| Compound No. 1 | 10 | 20 | | |
| Comparative Compound[1)] | | | 10 | |
| Comparative Compound[2)] | | | | 10 |
| LC[3)] | 90 | 80 | 90 | 90 |
| Physical Properties: | | | | |
| Retardation (R) (nm) | 170 | 88 | — | — |
| Thickness (d) (µm) | 1.02 | 1.02 | 1.01 | 1.00 |
| Surface Condition | good | good | poor[4)] (tacky) | medium[4)] (tacky) |

TABLE 1-continued

| | Example | | Comp. Example | |
|---|---|---|---|---|
| | 1 | 2 | 1 | 2 |
| Homogeneity | good | good | medium[5] (nonuniform) | medium[5] (nonuniform) |

1) Comparative compound 1:

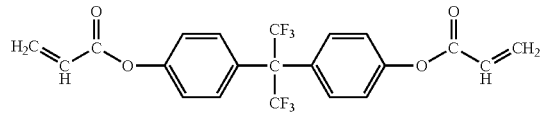

2) Comparative compound 2 (R-551, from Nippon Kayaku Co., Ltd):

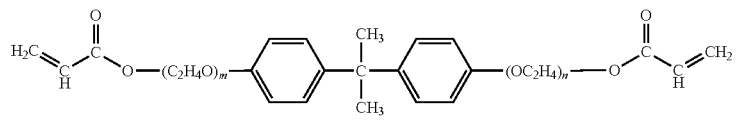

wherein m and n are integers satisfying the relation m + n = 4.

3) LC:

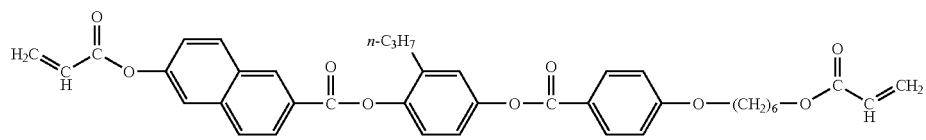

4) Surface unevenness was observed, and the film felt tacky.
5) Nonuniform alignment was observed in part.

Whereas the comparative polymerizable compositions containing compounds other than the polymerizable compounds of the invention failed to provide homogeneous polymer films (Comparative Examples 1 and 2), the polymerizable composition of the present invention was good in film formation control and liquid crystal phase fixation and provided a polymer film with uniform optical characteristics, as demonstrated in Example 1.

Example 2 proves that excellent properties with respect to film formation control and liquid crystal phase fixation and uniform optical characteristics are secured even when the proportion of the polymerizable compound of the invention in the polymerizable composition is increased to 20%.

The polymer obtained by photocuring the polymerizable composition of the invention shows uniform film formation control and uniform optical characteristics and is suited for use as an optical film for display devices.

INDUSTRIAL APPLICABILITY

The polymerizable compound of the invention is a novel compound. The polymer of the invention, which is prepared by photopolymerizing a polymerizable composition containing the polymerizable compound retains a uniform film state and is useful as a material excellent in heat resistance, solvent resistance, transparency, optical characteristics, and liquid crystal alignment fixation.

The invention claimed is:

1. A polymerizable compound represented by general formula (1):

[Formula 1]

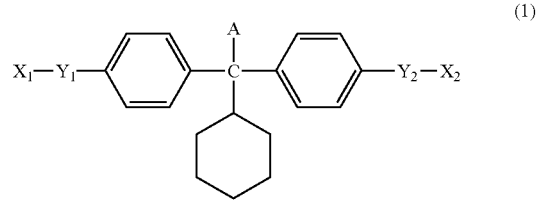

(1)

wherein A represents a ring assembly composed of at least two 6-membered rings each optionally having a substituent; $X_1$ and $X_2$ each represent a (meth)acryloyloxy group; and $Y_1$ and $Y_2$ each independently represent a single bond, an optionally branched alkylene group having 1 to 8 carbon atoms, an ether linkage, —COO—, —OCO—, a 6-membered ring optionally having a substituent, a naphthalene ring optionally having a substituent, or a combination thereof; the substituent being a hydrogen atom, a halogen atom, a nitrile group, an optionally branched alkyl group having 1 to 8 carbon atoms, an optionally branched alkoxy group having 1 to 8 carbon atoms, or an optionally branched alkenyl group having 2 to 8 carbon atoms, wherein the alkyl, alkoxy, or alkenyl group may have its —$CH_2$— moiety replaced with a sulfur atom or an oxygen atom and may have its hydrogen atom replaced with a halogen atom or a nitrile group.

2. The polymerizable compound according to claim 1, wherein each of the structures represented by $X_1$—$Y_1$— and $X_2$—$Y_2$— is a member selected from formulae (2) to (5):

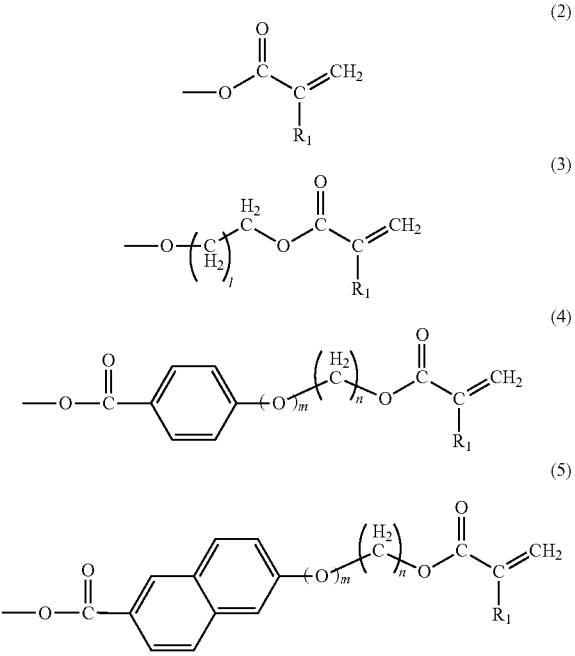

wherein $R_1$ represents a hydrogen atom or a methyl group; l represents an integer 0 to 7; m represents 0 or 1; and n represents an integer 0 to 8.

3. The polymerizable compound according to claim 1, wherein A is a member selected from the group consisting of the following ring assemblies:

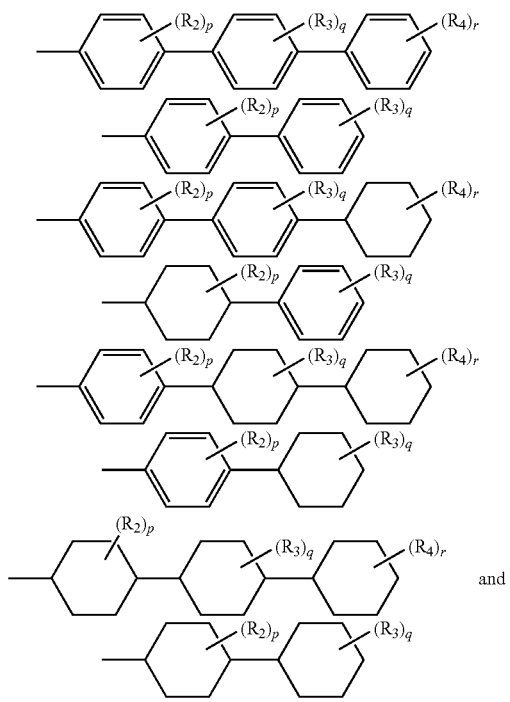

and wherein $R_2$, $R_3$, and $R_4$ each independently represent a hydrogen atom, a halogen atom, a nitrile group, an optionally branched alkyl group having 1 to 8 carbon atoms, an optionally branched alkoxy group having 1 to 8 carbon atoms, or an optionally branched alkenyl group having 2 to 8 carbon atoms, wherein the alkyl, alkoxy, or alkenyl group may have its —$CH_2$— moiety replaced with a sulfur atom or an oxygen atom and may have its hydrogen atom replaced with a halogen atom or a nitrile group; p, q, and r each represent the maximum number of the substituents the benzene ring or the cyclohexyl ring may have; the $R_2$'s may be the same or different, the $R_3$'s may be the same or different, and the $R_4$'s may be the same or different.

4. The polymerizable compound according to claim 1, wherein A is represented by formula (6):

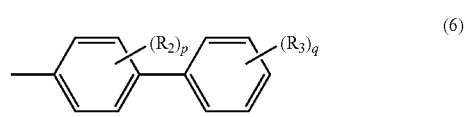

wherein $R_2$ and $R_3$ each independently represent a hydrogen atom, a halogen atom, a nitrile group, an optionally branched alkyl group having 1 to 8 carbon atoms, an optionally branched alkoxy group having 1 to 8 carbon atoms, or an optionally branched alkenyl group having 2 to 8 carbon atoms, wherein the alkyl, alkoxy, or alkenyl group may have its —$CH_2$— moiety replaced with a sulfur atom or an oxygen atom and may have its hydrogen atom replaced with a halogen atom or a nitrile group; p represents 4; q represents 5; the $R_2$'s may be the same or different; and the $R_3$'s may be the same or different.

5. A polymerizable composition comprising the polymerizable compound according to claim 1.

6. The polymerizable composition according to claim 5, further comprising a liquid crystal compound.

7. The polymerizable composition according to claim 6, wherein the liquid crystal compound has a polymerizable functional group.

8. The polymerizable composition according to claim 5, further comprising an optically active compound and having a cholesteric liquid crystal phase.

9. The polymerizable composition according to claim 5, further comprising a radical polymerization initiator.

10. A polymer obtained by photopolymerizing the polymerizable composition according to claim 5.

11. The polymer according to claim 10, having optical anisotropy.

12. An optical filter for a display device comprising the polymer according to claim 10.

13. The polymerizable compound according to claim 2, wherein A is a member selected from the group consisting of the following ring assemblies:

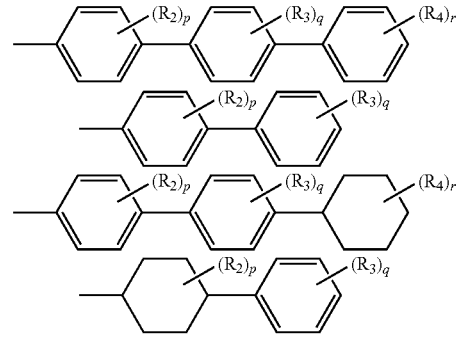

-continued

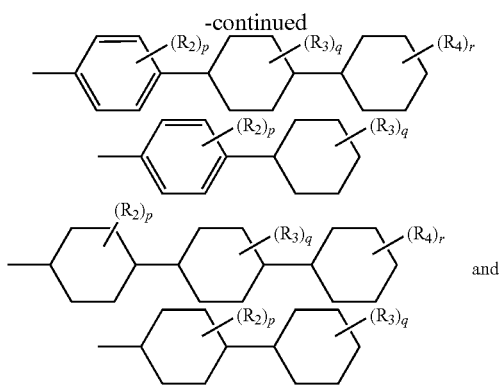

and wherein $R_2$, $R_3$, and $R_4$ each independently represent a hydrogen atom, a halogen atom, a nitrile group, an optionally branched alkyl group having 1 to 8 carbon atoms, an optionally branched alkoxy group having 1 to 8 carbon atoms, or an optionally branched alkenyl group having 2 to 8 carbon atoms, wherein the alkyl, alkoxy, or alkenyl group may have its —$CH_2$— moiety replaced with a sulfur atom or an oxygen atom and may have its hydrogen atom replaced with a halogen atom or a nitrile group; p, q, and r each represent the maximum number of the substituents the benzene ring or the cyclohexyl ring may have; the $R_2$'s may be the same or different, the $R_3$'s may be the same or different, and the $R_4$'s may be the same or different.

14. The polymerizable compound according to claim 2, wherein A is represented by formula (6):

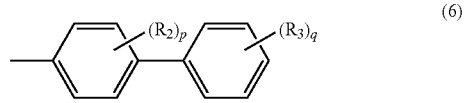

(6)

wherein $R_2$ and $R_3$ each independently represent a hydrogen atom, a halogen atom, a nitrile group, an optionally branched alkyl group having 1 to 8 carbon atoms, an optionally branched alkoxy group having 1 to 8 carbon atoms, or an optionally branched alkenyl group having 2 to 8 carbon atoms, wherein the alkyl, alkoxy, or alkenyl group may have its —$CH_2$— moiety replaced with a sulfur atom or an oxygen atom and may have its hydrogen atom replaced with a halogen atom or a nitrile group; p represents 4; q represents 5; the $R_2$'s may be the same or different; and the $R_3$'s may be the same or different.

15. The polymerizable compound according to claim 3, wherein A is represented by formula (6):

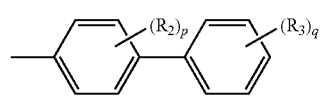

(6)

wherein $R_2$ and $R_3$ each independently represent a hydrogen atom, a halogen atom, a nitrile group, an optionally branched alkyl group having 1 to 8 carbon atoms, an optionally branched alkoxy group having 1 to 8 carbon atoms, or an optionally branched alkenyl group having 2 to 8 carbon atoms, wherein the alkyl, alkoxy, or alkenyl group may have its —$CH_2$— moiety replaced with a sulfur atom or an oxygen atom and may have its hydrogen atom replaced with a halogen atom or a nitrile group; p represents 4; q represents 5; the $R_2$'s may be the same or different; and the $R_3$'s may be the same or different.

16. A polymerizable composition comprising the polymerizable compound according to claim 2.

17. A polymerizable composition comprising the polymerizable compound according to claim 3.

18. A polymerizable composition comprising the polymerizable compound according to claim 4.

19. The polymerizable composition according to claim 6, further comprising an optically active compound and having a cholesteric liquid crystal phase.

20. The polymerizable composition according to claim 7, further comprising an optically active compound and having a cholesteric liquid crystal phase.

* * * * *